United States Patent
Anderson, Jr.

[11] Patent Number: 5,308,125
[45] Date of Patent: May 3, 1994

[54] SEALED CONNECTOR FOR AUTOMOTIVE A/C SYSTEM

[75] Inventor: Russell C. Anderson, Jr., North Tonawanda, N.Y.

[73] Assignee: General Motors Corporation, Detroit, Mich.

[21] Appl. No.: 14,924

[22] Filed: Feb. 8, 1993

[51] Int. Cl.⁵ ............................................. F16L 23/16
[52] U.S. Cl. ......................... 285/349; 285/363; 285/379; 285/910
[58] Field of Search ................. 285/137.1, 910, 918, 285/342, 343, 363, 405, 349, 379; 277/235 R

[56] References Cited

U.S. PATENT DOCUMENTS

| | | | |
|---|---|---|---|
| 2,191,044 | 2/1940 | Seligman | 285/910 X |
| 2,513,178 | 6/1950 | Jackson | 285/910 X |
| 3,042,430 | 7/1962 | Guy | 285/349 X |
| 3,198,480 | 8/1965 | Morse | 251/148 |
| 3,448,986 | 6/1969 | Jelinek et al. | 285/349 X |
| 3,966,235 | 6/1976 | Lewis | 285/25 |
| 4,155,571 | 5/1979 | Gastineau | 285/910 X |
| 4,790,568 | 12/1988 | Skibowski | 285/28 |
| 5,076,617 | 12/1991 | Bronnert | 285/349 |

Primary Examiner—Dave W. Arola
Attorney, Agent, or Firm—Patrick M. Griffin

[57] ABSTRACT

A sealed connector for an automotive air conditioning system compresses a sealing ring between accurately ground, axially opposed sealing surfaces of a pair of mated connector blocks that are bolted together. A steel retainer to which the sealing ring is molded prevents it from being blown out under high pressure, and one of the connector blocks is relieved to accommodate the retainer, thereby preventing interference with the clamping of the blocks. Seal compression is even and complete.

2 Claims, 3 Drawing Sheets

SEALED CONNECTOR FOR AUTOMOTIVE A/C SYSTEM

This invention relates to connectors for automotive air conditioning systems in general, and specifically to a sealed connector that provides assured sealing contact in a high pressure environment.

BACKGROUND OF THE INVENTION

Heat exchangers used in automotive air conditioning systems, such as evaporators or condensers, must be removably connected to refrigerant carrying lines in the system, which are under high pressure. It is important that the seal be fluid tight, and it is advantageous that the connection be simple and reliable to make and break.

A typical connector currently in use is shown in FIG. 1, and indicated generally at (10). Connector (10) is used to connect both the inlet and outlet of an evaporator to a compressor suction line (12) and a condenser liquid line (14), in one step. The ends of the lines (12) and (14) are upset or shouldered at (16) and (18) to create an axial stop surface, and are received with radial clearance through two cylindrical sealing sockets (20) and (22) bored into the face of a connector block (24). Before the lines (12) and (14) are inserted, a pair of O-rings (26) and (28) are stretched over the ends of the lines (12) and (14) and against the stop shoulders (16) and (18). Finally, a clamping plate (30) is attached to block (24), by a central bolt (32) to clamp the stop shoulders (16) and (18) in place. The abutment of plate (30) with block (24) signals the assembler that the connection is complete. However, the compression control of the O-rings (26) and (28) arises not from the axial tightening of bolt (32) or from the abutment of plate (30), but instead from the radial interference with the sealing sockets (20) and (22).

An advantage of the typical connection just described is that the shoulders (16) and (18) act as retainers to prevent the rings (26) and (28) from being blown axially out of their sockets (20) and (22) by the high pressure refrigerant. A disadvantage is that the rings (26) and (28) may become damaged or cocked as they enter the sockets (20) and (22), especially with repeated making and breaking of the connection. Furthermore, the degree of compression of the seal is dependent upon the radial gap between the upset ends of the lines (12) and (14) and their respective sockets (20) and (22). That gap cannot be held as precisely as the gap between two machined surfaces.

SUMMARY OF THE INVENTION

The invention provides a connector in which the control of the seal compression is assured by the axial abutment of a pair of block members, and in which the metal retainer for the seal does not interfere with or cooperate in setting that seal compression.

In the embodiment disclosed, the connector handles a single refrigerant line. A first connector block has a refrigerant passage of predetermined diameter bored through it, opening through a flat primary engagement face. Counterbored into the face, and surrounding the passage opening, is an annular seal pocket that provides a primary seal face, axially inset from the engagement face. A second connector block has a matching, secondary engagement face, from which projects a tubular inlet sized to fit freely into the refrigerant passage, and surrounded by an annular shoulder that fits freely into the seal pocket. The shoulder is axially stepped, comprising an annular, secondary seal face surrounded by an annular relief notch.

A bolt or other clamping means is provided to hold the blocks snugly together. When the blocks are connected and the shoulder and seal pocket interfitted, a pair of axial gaps are created, a lesser thickness gap between the axially opposed seal faces, and a greater thickness gap between the primary seal face and the relief notch.

A sealing assembly is designed to cooperate with the two gaps. A metal retainer ring with a diameter matching the relief notch, but thinner than the greater gap, surrounds an elastomeric seal ring with a diameter matching the secondary seal face, and thicker than the lesser gap. Before the blocks are clamped together, the sealing assembly is placed between them, concentric to the refrigerant passage and inlet. The elastomeric ring is assured of complete, even compression between the axially opposed, accurately ground seal faces, without interference from the retainer.

DESCRIPTION OF THE PREFERRED EMBODIMENT

These and other features of the invention will appear from the following written description, and from the drawings, in which.

Figure 1:
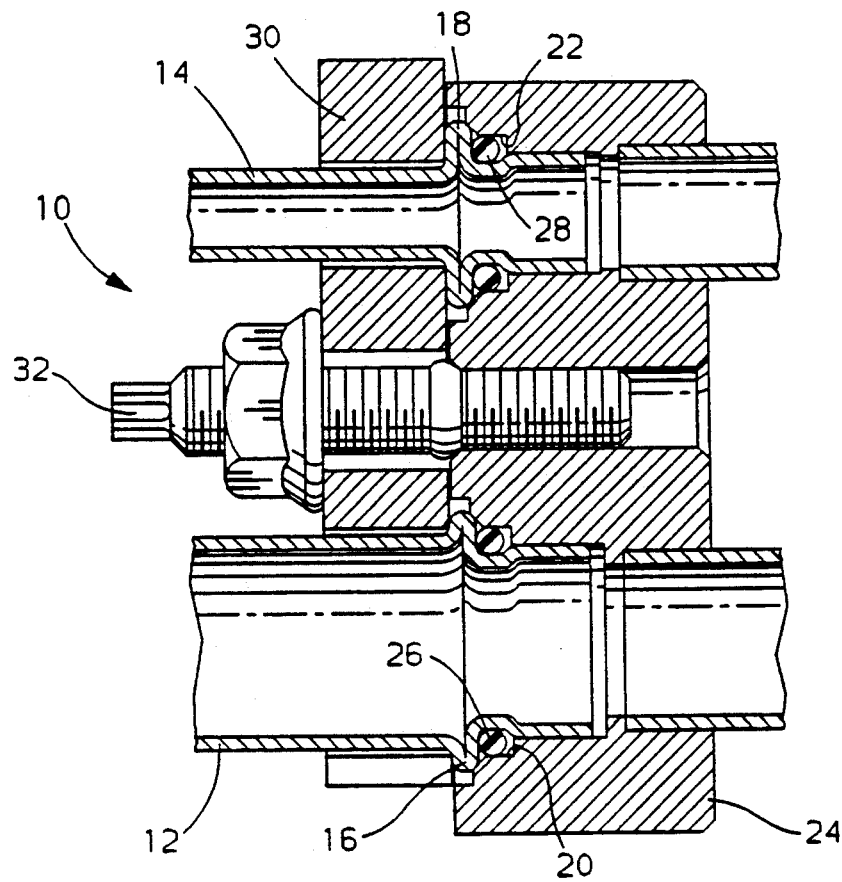
FIG. 1 is the prior art connector already described above.
Figure 2:
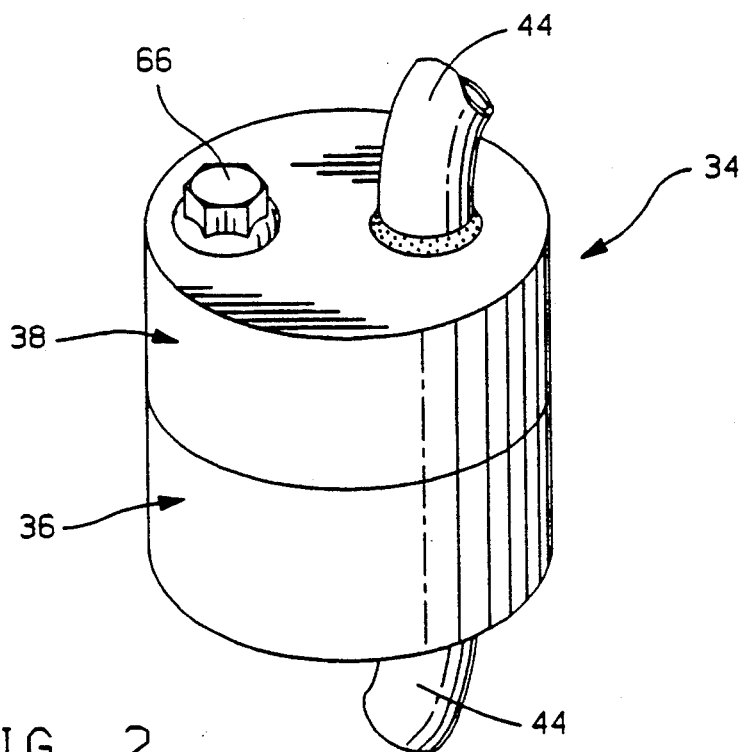
FIG. 2 is a perspective view of a preferred embodiment of the connector of the invention.
Figure 3:
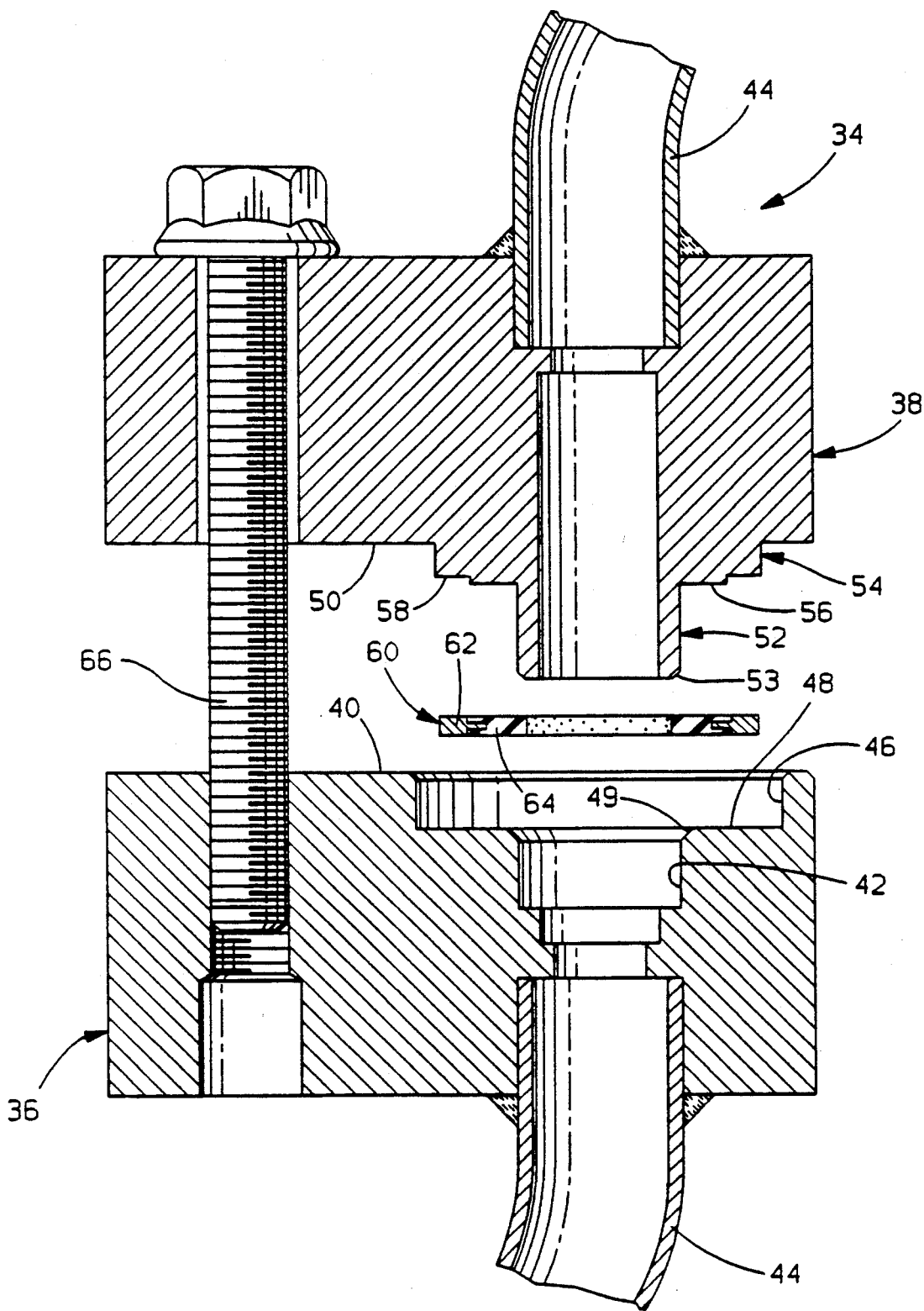
FIG. 3 is a cross section through the connector with the various components axially parted and aligned.

Referring first to FIGS. 2 and 3, a preferred embodiment of the sealed connector of the invention is indicated generally at (34). The two main components are a first and second connector block, indicated at (36) and (38) generally, which are cylindrical in form and machined from aluminum. First connector block (36) is machined with a flat inner surface (40) that provides a primary engagement face. Bored through its center is a stepped cylindrical refrigerant passage (42). Welded into passage (42) at the outside of first block (36) is one part of a refrigerant line (44), which could be any line, such as the suction line from the evaporator outlet to the compressor inlet, or the liquid line from the condenser to the expansion valve. The inner diameter of passage (42) is determined in advance by the size of line (44), and is large enough so as to not constrict flow therethrough. Counterbored into face (40) and surrounding the other end of passage (42) is an annular seal pocket (46), which provides a flat primary seal face (48) that is axially inset from primary engagement face (40). In addition, the interface between primary seal face (48) and passage (42) is chamfered at (49), for a purpose described below.

Figure 4:
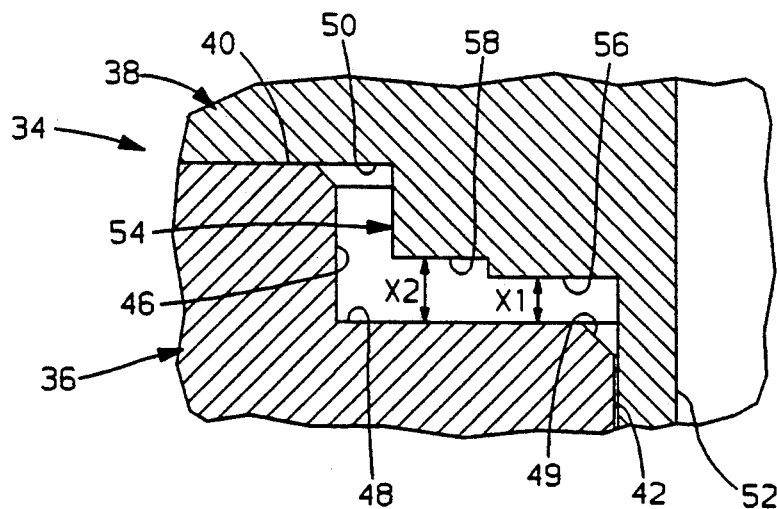
FIG. 4 is an enlarged portion of the cross section of the blocks clamped together, without the seal assembly in place.

Still referring to FIGS. 3 and 4, second connector block (38) is similar as to material and shape, with a flat inner surface (50) that provides a secondary engagement face abutable with (40). Projecting therefrom is a tubular inlet (52) sized to fit freely into passage (42), that is, with axial and radial clearance. The outer edge of tubular inlet (52) is chamfered at (53). At the outside of block (38), the other half of line (44) is welded in line with inlet (52). Surrounding inlet (52) is a stepped annular shoulder (54) which, in general, is sized to fit freely into seal pocket (46). More specifically, shoulder (54) comprises a radially inboard, annular secondary seal face (56) that is axially outset from secondary engagement face (50), and which is itself surrounded by an annular relief notch (58).

Referring next to FIG. 4, the ultimate result of the relative size and shape of the surfaces described above is illustrated. When the respective engagement faces (40) and (50) are abutted, with tubular inlet (52) plugged into passage (42), the secondary seal surface (56) and relief notch (58) create a pair of lesser thickness and greater thickness axial gaps relative to the axially opposed primary seal surface (48), indicated at X1 and X2 respectively. Since the surfaces are machined on solid metal blocks, they can be fairly accurately maintained, as compared to the radial gap in the prior art seal described above. Elsewhere, there is a significant radial gap between pocket (46) and shoulder (54,) and a small radial gap between passage (42) and inlet (52). Furthermore, a relief space is created between the chamfer (49) and passage (42), indicated by the circled area, which serves a purpose described below. Somewhere in this series of gaps, a complete blocking seal must be provided in order to prevent the leakage of the high pressure refrigerant out of line (44) and between the mated blocks (36) and (38).

Referring again to FIG. 3, a seal assembly, indicated generally at (60), provides the necessary seal. Seal assembly (60) includes an outboard annular steel retainer (62), with an axial thickness that is less than X2, but slightly greater than X1, and a diameter substantially equal to the relief notch (58). Integrally molded to the inside of retainer (62) is an annular elastomeric seal ring (64), molded of a suitable seal material. The axial thickness of seal ring (64) is approximately the same as its retainer (62), and its diameter is substantially equal to secondary seal face (56), but with its radially innermost edge being slightly smaller in diameter than the cylindrical outer surface of tubular inlet (52). It is not possible to control the dimensions of the elastomeric seal ring (64) as precisely as the steel retainer (62). However, by sizing it as described, dimensional control of that precision is not necessary, as described below.

Figure 5:
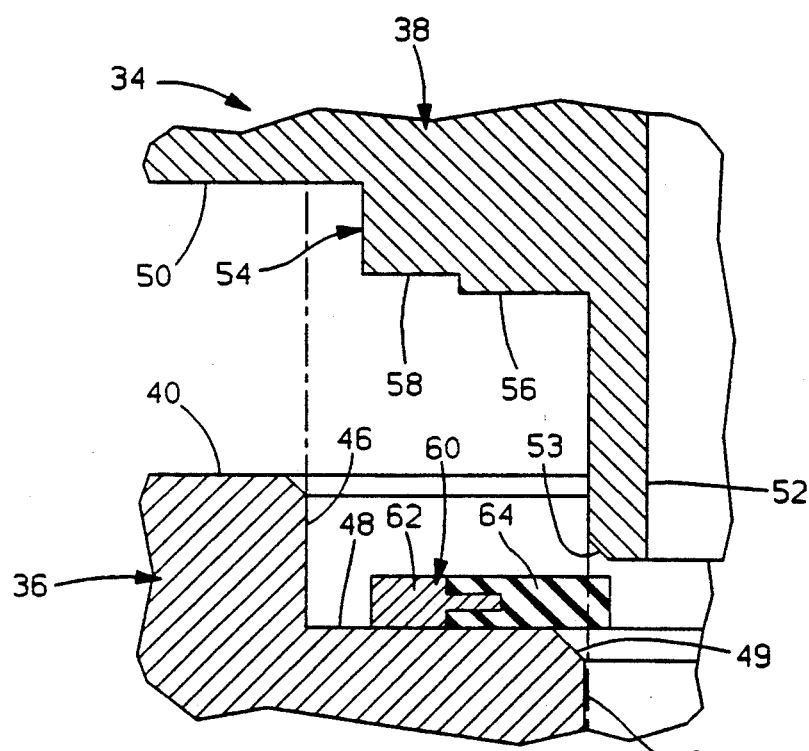
FIG. 5 is a view similar to FIG. 4, but showing the seal assembly in place as the connector blocks move together.

Referring next to FIGS. 3 and 5, the initial steps in the final assembly of sealed connector (10) are illustrated. A clamping means, here a threaded bolt (66), is provided to draw the connector blocks (36) and (38) securely together in the axial direction. Before the bolt (66) is tightened, the seal assembly (60) is dropped in place in seal pocket (46), against primary seal face (48), and at least approximately centered with passage (42). Since retainer (62) has a fair degree of radial clearance relative to seal pocket (46), dropping it in place alone will not serve to precisely center it on passage (42), but precise centering is not necessary. This unencumbered drop in of seal assembly (60), it will be appreciated, is much simpler to accomplish than the push on installation of the O-rings described above.

Figure 6:
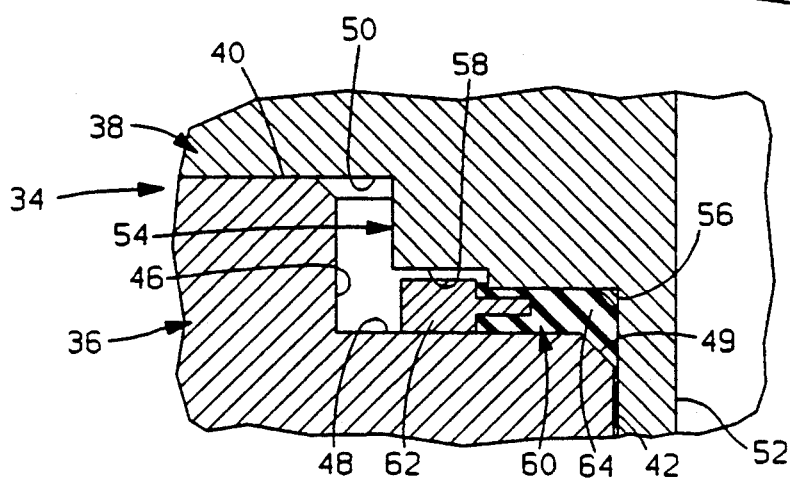
FIG. 6 is a view similar to FIG. 5, showing, the blocks clamped and the seal ring compressed.

Referring next to FIGS. 5 and 6, the next step is to align tubular inlet (52) with passage (42), which is easily achieved by the operator shifting the same shaped connector blocks (36) and (38) into alignment with each other. This alignment can be sensed manually if visual access is limited. Then, the bolt (66) is tightened. The chamfered edge (53) of tubular inlet (52), even if it is not precisely centered relative to seal ring (64), will eventually engage it, and will, given the flexibility of ring (64), shift ring (64) until it is centered. As bolt (66) continues to tighten, tubular inlet (52) enters passage (42), and shoulder (54) enters pocket (46). Eventually, the engagement faces (40) and (50) abut, which is easily sensed by the operator, and the tightening of bolt (66) is ended.

Referring finally to FIG. 6, the result of tightening bolt (66) to completion is illustrated. As tubular inlet (52) passes through the inner edge of seal ring (64), which, as noted above, is slightly undersized relative to it, some of the elastomeric material is drawn axially down. This seal material is sheared, in effect, between the two chamfered edges (49) and (53) as they move axially past one another, but is not cut or damaged by any sharp edges. As the blocks (36) and (38) seat on one another, the seal ring (64) is assured of complete and unrestricted axial compression between the primary seal face (48) and secondary seal face (56). Complete compression is assured both because seal ring (64) is thicker than X1, causing it to be squeezed down, and because the retainer (62) is less thick than X2, which guarantees that the retainer (62) will not bind between the blocks (36) and (38) to prevent their complete seating. In addition, retainer (62) can float axially in the gap X2, finding its own equilibrium position, which helps to prevent interference with the compression of ring (64). Any excess material from ring (64) displaced by the squeezing down process can shift axially down into the relief space described above, preventing overcompression and blocking the radial clearance between passage (42) and inlet (52). The net result is a complete sealing and blocking of the various gaps, both radial and axial, between inlet (52) and passage (42). Seal ring (64) will hold up to the very high pressures involved, since it is backed up by metal in more than one direction. That is, forces acting axially upwardly as viewed in FIG. 6, force seal ring (64) axially into flat secondary seal face (56). Forces acting radially outwardly are resisted by retainer (62). Should it be necessary to break the connection, seal assembly (60) will be visible, whether it stays in pocket (46) or remains on shoulder (54). If it needs replacement, it can be easily stripped off by grasping retainer (62), which is accessible, and replaced.

In conclusion, a high pressure, high reliability, easily handled and replaced seal is provided with a minimal number of component parts. The same advantages could be incorporated in other embodiments. For example, one block could be machined totally flush on it's inner surface, combining its engagement face and sealing face into one, in effect. Then, the other connector block would have an annular sealing face machined into it axially offset from its engagement face, so as to create the lesser thickness axial gap for compression of the seal ring. The relief notch could then be machined into either block, surrounding the secondary sealing face, and providing the greater axial gap to make room for the retainer. Therefore, it will be understood that it is not intended to limit the invention to the specific embodiment disclosed.

The embodiments of the invention in which an exclusive property or privilege is claimed are defined as follows:

1. For use in an automotive air conditioning system having a high pressure compressor line to be connected to a heat exchanger, a sealed connector comprising:

- a first connector block having a planar primary engagement face and a refrigerant passage therethrough of predetermined diameter,
- a second connector block having a planar secondary engagement face abutable with said primary engagement face and a tubular inlet projecting therefrom sized to fit within said refrigerant passage with a slight radial clearance therefrom,
- a planar, primary seal face on said first block surrounding said passage,
- a planar, generally annular secondary seal face on said second block surrounding said tubular inlet and axially offset from said primary seal face so as to define a predetermined thickness axial gap therewith when said primary and secondary engagement faces are in abutment,
- one of said blocks also having a relief notch therein concentrically surrounding said secondary seal face and axially offset from the sealing face in the other of said blocks when said blocks are abutted so as to define a greater thickness axial gap therewith than said predetermined thickness axial gap,
- a sealing assembly comprised of a solid, annular retainer with a diameter substantially equal to said relief notch and an axial thickness less than said greater axial gap and an elastomeric, annular seal ring with a diameter substantially equal to said secondary sealing face and a thickness slightly greater than said predetermined axial gap, and,
- clamping means for applying a clamping force to said connector blocks to draw said engagement faces into tight abutment,
- whereby said sealing assembly may be placed between said connector blocks, concentric to said tubular inlet and refrigerant passage, before said clamping force is applied, after which said seal ring is assured of complete axial compression between said primary and secondary sealing faces while said retainer is assured of noninterference with said connector blocks 2. For use in an automotive air conditioning system having a high pressure compressor line to be connected to a heat exchanger, a sealed connector, comprising:

- a first connector block having a planar primary engagement face and a refrigerant passage therethrough of predetermined diameter, said refrigerant passage being surrounded by a counterbored seal pocket having an annular primary seal face axially inset from said primary engagement face,
- a second connector block having a planar secondary engagement face abutable with said primary engagement face and a tubular inlet projecting therefrom sized to fit within said refrigerant passage with a slight radial clearance therefrom, said tubular inlet being surrounded by a generally annular, axially stepped sealing shoulder sized to fit within said counterbored pocket with axial and radial clearance and comprised of a radially inboard secondary seal face axially outset from said secondary engagement face and a radially outboard relief notch axially inset from said secondary seal face, whereby, when said block engagement faces are abutted, said primary and secondary seal faces are axially spaced by a predetermined axial gap and said primary seal face and relief notch are axially spaced by a greater predetermined distance than said predetermined axial gap,
- a sealing assembly comprised of a solid, annular retainer with a diameter substantially equal to said relief notch and an axial thickness less than said predetermined axial gap and an elastomeric, annular seal ring with a diameter substantially equal to said secondary sealing face and a thickness slightly greater than said predetermined axial gap, and,
- clamping means for applying a clamping force to said connector blocks to draw said engagement faces into tight abutment,
- whereby said sealing assembly may be placed into said seal pocket before said clamping force is applied, after which said seal ring is assured of complete axial compression between said primary and secondary sealing faces while said retainer is assured of noninterference with said connector blocks.

* * * * *